July 28, 1953  R. GOURDON  2,646,929
INDEPENDENT ACTUATOR TENS TRANSFER DEVICE
Filed Nov. 14, 1947  5 Sheets-Sheet 1

INVENTOR
Robert Gourdon
BY
ATTORNEY

July 28, 1953  R. GOURDON  2,646,929
INDEPENDENT ACTUATOR TENS TRANSFER DEVICE
Filed Nov. 14, 1947  5 Sheets-Sheet 4

INVENTOR
Robert Gourdon
BY
ATTORNEY

Patented July 28, 1953

2,646,929

UNITED STATES PATENT OFFICE 2,646,929

INDEPENDENT ACTUATOR TENS TRANSFER DEVICE

Robert Gourdon, Paris, France, assignor to Societe Anonyme dite "Centre d'Etudes M. B. A." (Mecanique, Balistique, Armement), Paris, France Application November 14, 1947, Serial No. 785,976
In France November 19, 1946

14 Claims. (Cl. 235—137)

This invention relates to an improved printing-counter adapted for use in various types of adding machines, particularly although not exclusively in cash registers.

One object of the present invention is to achieve a printing-counter which is of simpler construction than the types of counters now in use, has the smallest overall proportions and operates more accurately, permitting the simultaneous reception of an entire sum, including units, tens, hundreds, etc., with the eventual addition of a prior sum, the necessary transfers being effected at the end of the reception operation while the mechanism is resuming its inoperative or reading position.

Another object of the invention is to avoid the extensive use of springs so as to obtain an almost completely positive operation.

A further object of the invention is to construct the counter of thin, shaped and pressed elements thereby simplifying the construction of the apparatus and reducing the overall dimensions thereof.

Other characteristics and advantages of the invention will appear in the following description of an apparatus according to the invention and with reference to the accompanying drawings representing diagrammatically and only by way of example, a particular embodiment of the invention.

In the embodiment shown in the drawings it will be seen, especially in Fig. 1, that the printing counter according to the invention comprises a number of numbered drums 1 or indicator rollers, carrying numbers engraved in relief upon flat surfaces, thereby permitting the same indicator wheels to be used in both the printing and calculating mechanisms as will be explained presently.

Figures 1, 2:
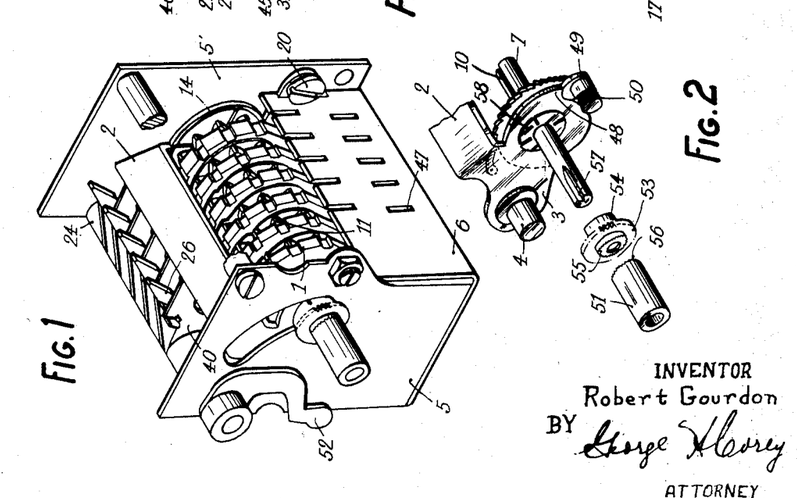
Fig. 1 is a perspective view of a counter unit according to the invention.
Fig. 2 is an exploded perspective view of a portion of said counter mechanism showing the abutment device for the cage of numbered wheels and a mechanism for resetting the apparatus.
Figures 3, 4, 9:
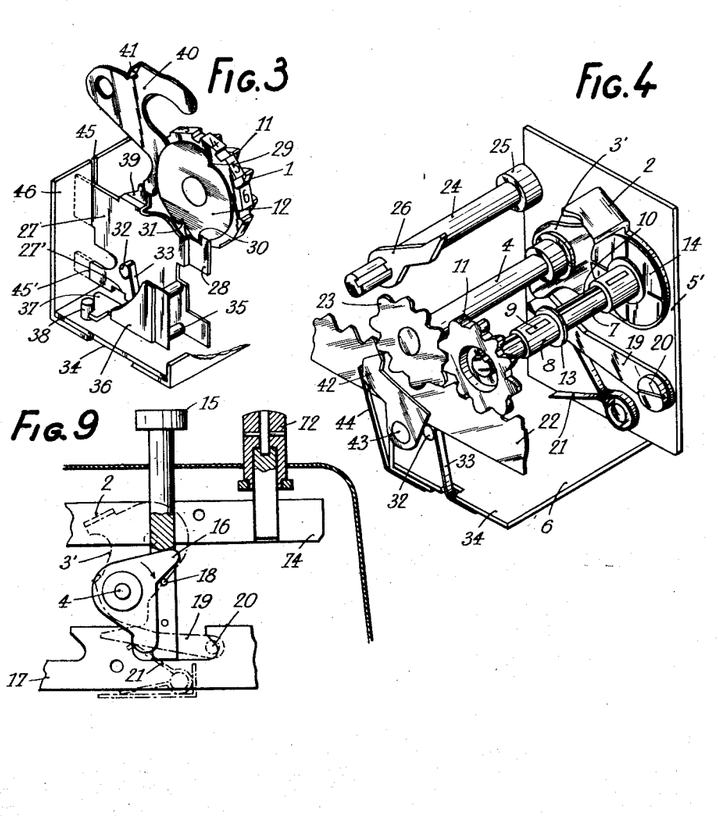
Fig. 3 is a perspective view of a numbered wheel with associated elements.
Fig. 4 shows in perspective view a part of the counter mechanism from which some elements have been removed in order to obtain a better view of the elements associated with each toothed wheel controlling the numbered drums and also to show certain other accessory elements such as the device for mounting the numbered drums and their associated members, the device for locking the wheel-carrying cage in its two extreme positions, the device for immobilizing the toothed wheels in inoperative and printing position and the device for bringing forward transfers.
Fig. 9 is a partial vertical section showing the key whereby the counter is put into operation and the key controlling the printing operation.

Said indicator rollers 1 are mounted in a movable cage 2 formed by two lateral flanges 3, 3' connected by a cross-member; said flanges are integral with a shaft 4 having trunnion-shaped ends pivotally mounted in fixed bearings (not shown in the drawing) secured on the lateral flanges 5, 5' of a stationary cage 6 (see Figs. 1 and 4).

The various indicator rollers 1 are mounted within said cage 6 on a common shaft 7 (Figs. 2 and 4) through the intermediary of sleeves 8 keyed to shaft 4 by means, for example, of a key 9 engaging a keyway 10 of shaft 7.

Each indicator wheel 1 is integral with a toothed driving gear 11 (Figs. 1 and 3 particularly) and, except for the wheel corresponding to the highest denominational order, i. e. the last wheel on the left of Fig. 1, each wheel is also integral with a cam 12 adapted to perform the transfer operations as will be made clear presently.

Each sleeve 8 is shorter in length than the aggregate axial widths of one indicator roller 1 plus its driving wheel 11 and its cam member 12; said sleeve has a shouldered portion 13 against which roller 1 and its two associate members are pressed and clamped through the action of a frictional spring 14 secured for example, on the shaft end (Fig. 4); said spring may be of the spring-washer type as shown, so that each drum will be held frictionally between the side faces 13 of successive sleeves 8 while the rotational movements of the indicator wheels 1 about their sleeves 8 on which they are loosely mounted become independent. In other words, the rotation of one indicator wheel 1 will not cause the next indicator wheel to rotate.

The rotation of shaft 4 integral with cage 2 is effected by depressing a key 15 acting on a cam member 16 (Fig. 9) mounted on shaft 4, preferably outside the external flanges 3 and 3' of cage 2, so as to prevent any rotational movement in relation thereto. When key 15 is depressed, cam 16 rotates in the direction shown by the arrow, Fig. 9, causing the assembly of indicator wheels to be lowered so as to permit their control by means of the tabulation members, as explained hereinafter.

Key 15 may be locked in its lower position by any suitable locking device such as those currently used in keyed mechanisms, particularly cash register keyboards. This locking system may include a bar 17 and a stud 18 carried by key 15 (Fig. 9).

In other words, cage 2 carrying the indicator wheels 1 may be set in two positions corresponding to those of key 15: an upper or inoperative, reading position and a lower or operative position. Cage 2 is held in either position through a holding means comprised e. g. of a lever 19 pivotally mounted at 20 and subject to the action of a spring 21 (see Fig. 4). The free end of lever 19 is suitably shaped to engage a portion of the periphery of flange 3' of cage 2; in Fig. 4, the cage is assumed to be in its lower or operative position while in Fig. 9 it is assumed to be in its upper or inoperative, reading position, the end of lever 19 engaging another portion of the periphery of flange 3' of cage 2.

When cage 2 has been lowered into its operative position, each gear wheel 11 may engage a tabulating member 22 whose position corresponds to the rough figure which will be recorded in each denominational order without taking the transfers into account.

In the example shown in Fig. 4 the tabulating members appear as rack-shaped parts whose longitudinal movements may be controlled directly or indirectly by means of any suitable key mechanism such as that commonly employed in cash registers, adding machines, and the like. Said mechanism is not shown in the drawing as it does not form part of the present invention.

Each gear wheel 11 engages with another gear wheel 23 (Fig. 4) which rotates freely about shaft 4 of cage 2. Since gear wheel 11 may mesh simultaneously with gear wheel 23 and rack 22, its thickness must be at least equal to the combined thickness of said wheel 23 and rack 22, placed together side by side.

On another shaft 24 arranged to rotate in bearings 25 mounted on flanges 5, 5' of the outer cage of the counter, a number of stopping or locking pawls 26 are keyed by means, for example, of a groove-and-spline device (Fig. 4). These pawls 26 serve to engage and stop the gear wheels 11 and in consequence the numbered drums 1, in their appropriate position with respect to each other when the cage is in its raised or inoperative, reading position; thus the proper alignment of the drums 1 with respect to each other is obtained and the figures may be clearly read through a window provided in the upper portion of the external cage of the counter.

Co-operating with each cam member 12 is a sliding plate member 27 having in its front portion an offset extension or lug 28 (Fig. 3) adapted to be driven and manipulated by the protruding portions of cam 12. The latter comprises three noses, viz.: nose 29 corresponding to the digit "0", nose 30 corresponding to the digit "8" and nose 31 corresponding to the digit "9".

The sliding plate 27 has a button or stud 32 against which bears a spring 33 whose other end is secured to the bottom 34 of the outer cage (see Figs. 3 and 4), said spring tending to press back the sliding plate 27. To each plate member 27 is secured by means for example of cross-ties 35, a thin plate 36 forming a spring and having a protruding portion or lug 37 provided in turn with an inclined portion co-operating with a fixed stud 38 carried by the bottom 34 of the outer cage of the counter.

The sliding plate 27 comprises in its upper portion a protruding member 49 co-operating with a locking arm 40 pivotally mounted on shaft 24; said locking arm 40 has a portion 41 projecting sidewise and acting, as will be presently disclosed, as a stopping means for resetting the numbered drums, through its co-operation with nose 29 of cam member 12. Finally, the plate member 27 has in its lower portion a notch 27' which at times receives the lug 37 on the sliding plate member 27 associated with the next adjacent numeral wheel of lower order, so as to lock the two members 27 together.

A pawl 42 is provided for engaging each gear wheel 23. Each pawl is mounted on a shaft 43 and pressed by a spring 44. The front portion of said pawl is cam-shaped and co-operates with the pin 32 in plate member 27. When the plate member 27 is in its rearmost position, the pin 32 bears rearwardly upon the cam-shaped portion of pawl 42 above shaft 43 thus holding the pawl disengaged from gear wheel 23 (see Fig. 8); when, contrariwise, sliding member 27 is pulled forward, pawl 42 may swing in the same direction, due to the action of spring 44, thus meshing with said gear wheel 23. When the latter is held stationary through engagement with pawl 42, the corresponding gear wheel 11 rolls over gear wheel 23 during the movement of cage 2 towards its inoperative position, whereupon the corresponding numbered drum 1 rotates one tenth of a revolution about its axis, this additional rotation representing one transfer.

It should be noted that spring 33 pressing upon stud 32 of plate member 27 is stronger than spring 44 so that when said slide is in its rearmost position, pawl 42 cannot engage its corresponding gear wheel 23.

Sliding members 27 are guided during their movements by slots 45 and 45' provided in the back flange 46 of outer cage 6 of the counter (see Fig. 3) and slots 47 provided in the front flange of said cage.

As will be observed in Fig. 2, flange 3 of the movable cage 2 has a plate member 48 which may bear against an eccentrically adjustable abutment 49, the latter being mounted on a member provided with a threaded portion 50 acting as adjusting member for setting the angular position of abutment 49. In the lower or operative position of cage 2, a nose carried by plate 48 bears against the abutment 49 which is provided to allow an accurate meshing of each toothed wheel 11 with its respective rack 22 in this position.

As will also be seen in Fig. 2, the shaft 7 on which the numbered drums 1 are mounted is provided at one end with a sleeve 51 which may be caused to rotate by means of a key for resetting manually, for example, the different numbered drums. In this respect it should be noted that for effecting the latter operation, the locking pawls 26 must first be raised and disengaged from the toothed wheels 11; this may be accomplished by means of an arm 52 (see Fig. 1) rigidly secured on shaft 24 on which are mounted said pawls 26. This arm 52 may be held stationary and locked in the position corresponding to the stopping of gear wheels 11 by means of pawls 26, through any suitable locking means.

In the case where there are several counters positioned one behind the other, a device may be provided for simultaneously resetting all the counters, which, nevertheless, can still be reset individually by operating sleeve 51. The simultaneous resetting device may comprise a rack controlled by any suitable system well known in the manufacture of adding machines and including a safety device such as the one to be described hereinafter with reference to a particular application of the invention to a multiple-counter machine. The aforesaid rack will mesh with a toothed wheel 53 integral with a sleeve 54 rotating freely on the shaft 7 of the numbered drums 1. Said sleeve 54 also carries on one side a clutch element 55 adapted to co-operate with a similar member 56 supported on sleeve 51 which is rigidly secured on shaft 7 by means, for example, of a pin penetrating into a groove 57 in said shaft (see Fig. 2).

The meshing of clutch members 55 and 56 is ensured by a spring 58 of the spring-washer type, mounted on shaft 7 and pressing axially the clutch element 55 against clutch element 56.

Figures 5, 6, 7, 8:
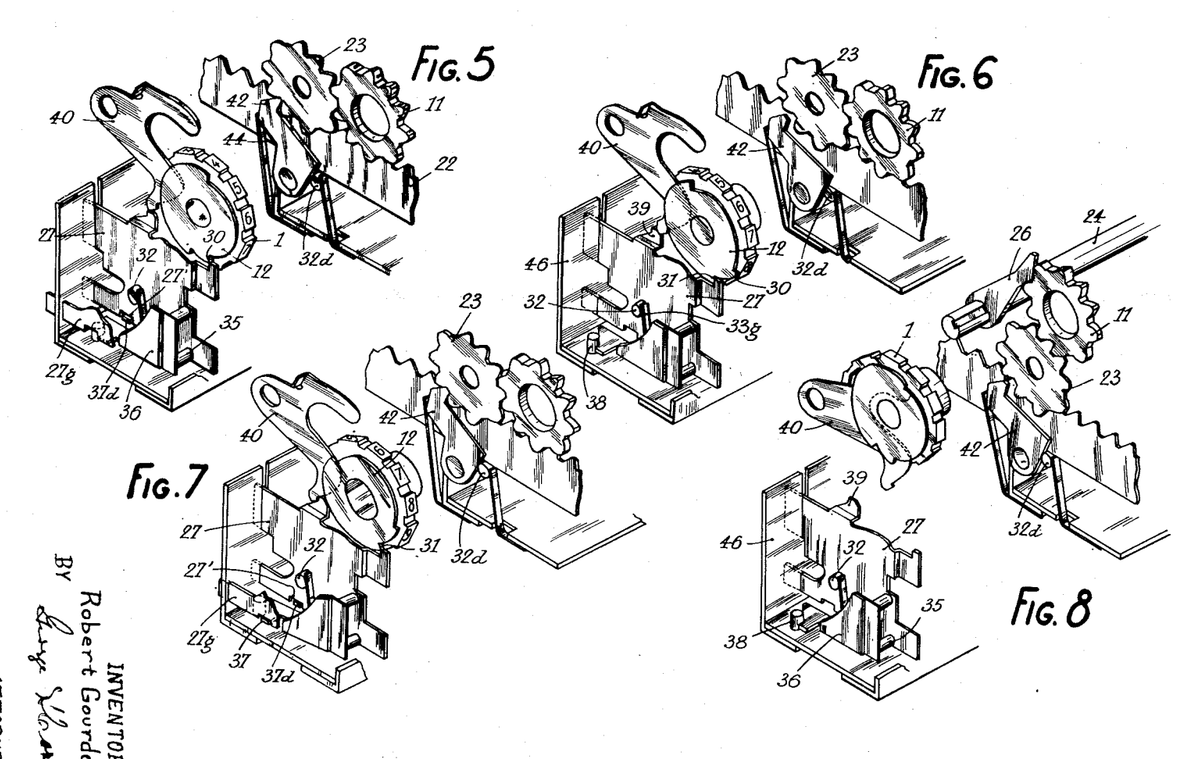
Figs. 5, 6 and 7 are perspective views of certain parts of the mechanism shown in three operating positions corresponding to various tabulation cases.
Fig. 8 is a perspective view similar to Figures 5, 6 and 7 but with the drum-carrying cage raised in its inoperative position.

In order to reset all the numeral wheels to their zero positions, a key is inserted in the end of sleeve 51 and it is rotated in a clockwise direction, as viewed in Fig. 2, through one complete revolution. The teeth 55 and 56 are so fashioned that the sleeve 51 can transmit motion in a clockwise direction to the sleeve 54 and thence to shaft 7, but motion cannot be transmitted in the reverse direction. This resetting operation takes place when the shaft 7 is in its upper or numeral indicating position, as shown in Fig. 8. The arm 52 is rotated slightly to turn shaft 24 and thereby to lift all the locking pawls 26 during the reset operation and permit free rotation of the gears. Since the arms 40 are rotatably mounted on shaft 24, this lifting of pawls 26 does not affect the arms 40. The lugs 41 on the locking arms 40 are then riding on the surfaces of the several cams 12. As the shaft 7 is rotated, the several numeral wheels are rotated with it, by virtue of the slip friction connection between the side faces 13 of the sleeves 8. As soon as any numeral wheel reaches a point where the nose 29 on its cam 12 engages the lug 41 on its associated locking arm 40, then the rotation of that numeral wheel is stopped. The other numeral wheels continue to rotate until their respective cam noses 29 engage their corresponding stop lugs 41. This angular position of the numeral wheels is the zero indication position. If the shaft 7 is rotated through one complete revolution, then all the numeral wheels will be reset to zero, regardless of their angular position at the time the resetting operation is started.

After the apparatus has been reset, the rack controlling gear wheel 53 may resume its initial position, wheel 53 rotating in the opposite direction without driving sleeve 51 and the return stroke of the rack being sufficient to allow the free rotary movement of pinion 53.

Figure 10:
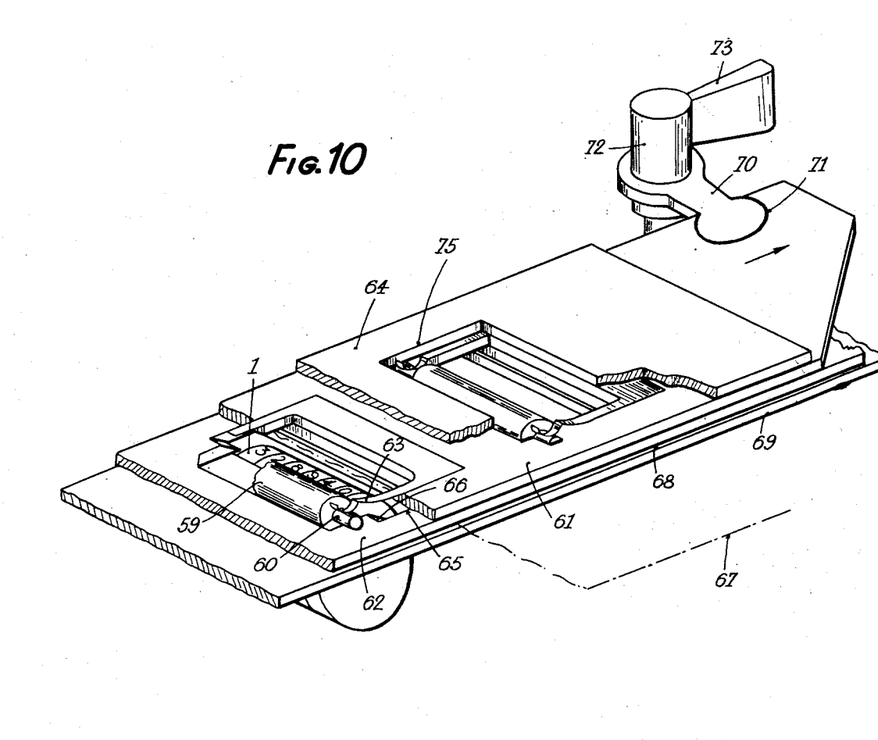
Fig. 10 is a perspective view of a device used for the printing operation, showing the application of this device to a two-counter unit.

The printing of the figures appearing in the counter on a sheet of paper may be accomplished by means of the device shown in Fig. 10 wherein two tandem counters are illustrated, it being obvious that the same device is applicable using one or any other number of counters.

As shown in the drawing, the printing device comprises a roller 59 having trunnion members 60 mounted in a sliding driving plate 61, said trunnions being carried themselves in a supporting plate 62 on which they are adapted to slide and pressed by means of springs 63 which may be clamped and secured between the sliding plate 61 and an upper guiding plate 64 for said sliding plate.

The supporting plate 62 for trunnions 60 of the printing roller 59 is provided, for each counter, with a window 65 corresponding to the numbered drums 1 and the printing roller 59; on the side edges of this window are provided inclines 66 over which the trunnions 60 of the printing roller 59 are adapted to be lowered when these trunnions have been brought, by the sliding plate 61, opposite said inclines. At this moment the printing roller 59 is lowered, its trunnions 60 being urged against the inclines 66 due to the action of springs 63. Said roller is then pressed or struck against the numbered drums 1, a sheet of paper 67 with carbon paper having been interposed beforehand between the roller 59 and the printing wheels 1 through a slot 68 provided between the plate 62 supporting the printing roller trunnions 59 and a lower guiding plate 69 for the sheet of paper.

The sliding plate 61 of the printing rollers may be controlled by means of a lever 70 having, for example, at its free end, a flat swivel engaging a corresponding notch 71 provided at the end of the driving plate 61. This lever 70 is rigidly secured to a hub 72 having, for example, a control lever 73. As shown in Fig. 9, the lower portion of hub 72 is mounted between two adjacent plates 74 of which only one is seen in this figure.

The operational sequence of the counter described hereinabove will now be given with reference to Figs. 5 to 8 showing several particular cases of operation. In these figures a single drum 1 associated with its cam member 12, its sliding member 27 and the parts carried thereby are shown, the gear wheel 11 corresponding to this numbered drum having been moved toward the right along with its associated members, for the purposes of clarity.

It will be noted that in these figures an assembly similar to that shown on the right side but relating to the next numbered drum which will normally be positioned on the left hand side of drum 1, will be located in the gap between the two cross-ties 35 through which the spring blade 36 is secured to the sliding member 27.

For a better understanding of the operational sequence applying to the above-described apparatus, reference will be made to three particular instances, corresponding to various positions of the registering members and their associated parts shown in Figs. 5, 6 and 7 respectively, Fig. 8 showing these same elements after they have resumed their inoperative or printing position.

In the first case, Fig. 5 shows the position of the various parts when the following operation is performed:

```
                              1  2  8  ,  5  8  7
                       +         3  5  ,  3  1  4
Result before transfers____   1  5  3  ,  8  9  1
Transfers ________________       1        1  1
Final result _____________    1  6  3  ,  9  0  1
```

The numbered drum 1 and the gear wheel 11 correspond to the second denominational order, i. e. the tens, while the stud 32d corresponds to the sliding member (not shown in Fig. 5) of the preceding denominational order, i. e. the units and the sliding member 27g corresponds to the following denominational order, i. e., the hundreds.

Referring firstly to the units, it will be seen that number "7" becomes number "1" upon tabulation of figure "4" from the units column of the number to be added. This brought the sliding member corresponding to the units denominational order, i. e. that carrying the stud 32d in a forward position under the action of nose 31 of cam 12, corresponding to the units numbered drum, in which forward position said sliding member was locked by means of the locking arm 40 corresponding thereto (which would be called 40d if it were shown in Fig. 5). Under these condiitons, pawl 42 may rise due to the pressure exerted by its spring 44, its front edge no longer being held by the stud 32d. Thus, pawl 42 locks gear wheel 23 and therefore when the movable cage carrying the numbered wheels 1 will be displaced into its inoperative or reading position, the gear wheel provided for the tens will be driven over one tenth of a revolution due to the fact that the corresponding gear wheel 11 will roll over gear wheel 23 during this movement, thus causing, as previously stated, the numbered drum 1 to rotate an additional 1/10 of a revolution.

Referring next to the second denominational order, i. e. the tens, it will be seen that the numbered wheel 1 (before the transfer operation which takes place only during the upward movement of the drum-carrying cage when tabulation is completed) passed from digit "8" to digit "9" due to the tabulation of digit "1" from the tens column of the number to be added. During the passage from "8" to "9," wheel 1, through its nose 30 caused sliding member 27 to move forward, not enough to cause said member to be locked by the locking arm 40 but enough however, to cause it to be hooked by the projecting lug 37d of the adjacent sliding member located on the right side; said lug, now in a forward position since the preceding wheel of the units order has passed through zero, engages the notch 27' of sliding member 27 in the semi-forward position shown in Fig. 5. As the sliding member which would be 27d is set in a forward position, as explained hereinabove, the sliding member 27 of the tens is also locked in this forward or semi-forward position, and therefore, as before, the stud 32 of this sliding member 27 will release the corresponding pawl of the next denominational order to the left, i. e. the hundreds, which will be pawl 42g (not shown in the drawing for the purpose of clarity) so that the spring of said pawl causes the latter to engage the corresponding gear wheel (which would be gear wheel 23g of the hundreds). Thus, when all the wheels are brought to their inoperative position, the numbered drum of the hundreds will also rotate an addiitional 1/10 of a revolution corresponding to the transfer to hundreds.

Referring now to sliding member 27g corresponding to the hundreds, it will be seen that in Fig. 5 it is in its recessed position because in the hundreds denominational order, when tabulating the digit "5," the digit shown has become "8" after adding digit "3" from the number to be added, i. e. without involving the action of nose 30 or of nose 31 of cam member 12 in this denominational order.

For the subsequent denominational orders, the operations would appear in a similar way, with the gears and their associated parts in the desired positions corresponding to the operation described hereinabove by way of example.

In the following examples, the particular operation represented by the passing of a numbered drum from digit "8" to digit "9" when tabulating, will be called "pre-transfer" while the passing of this drum from "9" to "0" will be called "transfer operation."

As shown hereinabove, during pre-transfer operations, the corresponding sliding member is brought forward for a time but comes back as soon as the movable cage carrying the numbered wheels is raised towards its inoperative or reading position unless said sliding member has been locked by the lug 37 of the preceding sliding member which may have been left in a forward position for any given reason.

Fig. 6 shows a second case of operation corresponding to the following addition:

```
                              1  2  8  ,  2  5  3
                                    3  ,  5  4  4
Result without transfer___   1  2  1  ,  7  9  7
Transfer _________________       1
Final result _____________   1  3  1  ,  7  9  7
```

Firstly, taking the units denominational order, it will be seen that digit "3" becomes "7" after tabulating of digit "4" of the number to be added; in other words, there has been neither a change from "8" to "9" nor a passage through zero. Thus, stud 32d of the units is positioned in its recessed or back position and therefore pawl 42 of the tens, actuated by stud 32d is disengaged from the corresponding gear wheel 23, so that when the numbered drums assembly moves upwards to its inoperative position, this gear wheel will not become stationary but will rotate freely about its axis, being driven by the toothed wheel 11 which, under these conditions, will not perform an additional rotation of 1/10 of a revolution about its axis, i. e. no transfer will be performed by said wheel 11 for the tens.

Referring now to the tens, it will be noted that when passing from "5" to "9" after tabulating the digit "4," there has been a passage from "8" to "9" during which sliding member 27 has been brought forward by means of the nose 30 of cam member 12, but immediately after passage of said nose 30 the pressure of spring 33g causes sliding member 27 to resume its back position (shown in Fig. 6), pressing lug 28 against nose 31 of the sliding member corresponding to digit "9." It is well to remember that only during passage from "9" to "0" is sliding member brought forward in a manner sufficient to cause it to be locked by means of the locking arm 40, as shown in Fig. 7; moreover, during this temporary forward movement corresponding to a pre-transfer operation, sliding member 27 could not be held in this forward position unless it were "hooked" or engaged by lug 37d, not shown in Fig. 6, of the preceding sliding member also held in its forward position, which is not the case here.

(The manner in which sliding member 27 is held forward by the lug 37 associated with the next adjacent numeral wheel of lower order is illustrated in Fig. 7.)

Therefore, stud 32 of said sliding member has also resumed its back position, i. e. it is located in the same position as stud 32d, wherefore no transfer will take place for the same reasons as for the hundreds, which corresponds to the above-stated addition.

The positions of the members as shown in Fig. 7 correspond to the following addition:

```
                    3 2 8 , 6 9 7
                    2 4 5 , 3 1 4
Result without transfer____ 5 6 3 , 9 0 1
Transfer ________________    1 1   1 1
                            ─────────────
Final result_____________ 5 7 4 , 0 1 1
```

As in the preceding examples, Fig. 7 shows all the counter elements corresponding to the tens and only a few elements for the units and for the hundreds, the elements corresponding to higher denominational orders being removed for the purpose of clarity.

Referring firstly to the units, it will be seen that the digit "7" becomes "1" after the digit "4" of the added number has been tabulated, thus passing through the zero position and bringing the sliding member carrying the stud 32d into its forward position (as in Fig. 5). Moreover, this causes (for the same reasons as in Fig. 5) the engagement of pawl 42 with gear wheel 23, thus operating a transfer in the tens once the tabulation is completed and the numbered wheels assembly has been brought back to its upper inoperative position.

Considering now the tens, it will also be seen that, after tabulating the digit "1" of the added number, digit "9" has become "0," thus effecting another passage from "9" to "0". But in this case, the sliding member 27, due to the action of nose 31 of cam member 12, has been moved forward sufficiently to enable the locking of said sliding member by means of locking arm 40 as shown. Besides, the two adjacent slides 27 and that positioned on the right hand side thereof and carrying the lug 37d have been interlocked by means of said lug 37d and notch 27' of slide 27. Thus, the stud 32 will remain in its forward position causing, as explained above, a transfer which will take place in the hundreds according to the operation set forth above.

On the other hand, when considering the hundreds, it will be observed that after tabulating the digit "3," the digit "6" becomes "9"; in other words, sliding member 27g of the hundreds has been moved temporarily in its forward position wherein it has been held and locked by lug 37 of sliding member 27 of the tens, so that this slide 27g will be held in its locked forward position together with slide 27 while the stud carried thereby (which would be stud 32g) will perform under these conditions a transfer in the thousands according to the addition set forth above, the pre-transfer operation of slide 27g being transformed due to its locking by slide 27 into a transfer operation which would not have occurred if the preceding sliding member itself had not been moved forward for locking slide 27g.

The aforegoing examples, illustrated in Figs. 5, 6 and 7, describe the transfer and pre-transfer operations. The following examples will further illustrate said operations, in certain typical cases.

The first refers to a transfer operation releasing the entire set of transfers in the denominational orders wherein pre-transfers have been effected:

```
                        0 , 9 8 7 , 6 5 4
                            0 1 2 , 3 4 6
Result without transfer____ 0 , 9 9 9 , 9 9 0
Pre-transfer_______________   ─ ─ ─   ─ ─
Transfer__________________               1
                            ─────────────────
Final result_______________ 1 , 0 0 0 , 0 0 0
```

The second example relates to an operation in which no transfer has released other transfers in the denominational orders wherein pre-transfers have been made:

```
                        0 , 9 8 7 , 6 5 4
                            0 1 2 , 3 4 5
Result without transfer____ 0 , 9 9 9 , 9 9 9
Pre-transfer_______________   ─ ─ ─   ─ ─ ─
Transfer__________________       nought
                            ─────────────────
Final result_______________ 0 , 9 9 9 , 9 9 9
```

When the tabulation is completed and it is desired to register the total in the counter concerned, the movable cage 2 rotates about the axis of its shaft 4 until it reaches the upper position shown in Fig. 8.

In every denominational order where gear wheels 23 would be held stationary by the pawl 42, wheel 11 rolls over this wheel 23 and causes the corresponding numbered drum to rotate 1/10 of a revolution, thus effecting the transfer operation.

On completion of this movement, the shaft 7 on which the numbered drums 1 are mounted engages a notch provided in the locking arms 40 and raises the latter to free slides 27 which were in their forward position. The slides 27 act through studs 32 to disengage the corresponding pawls 42 from wheels 23. On completion of the upward movement of cage 2 (position shown in Fig. 8) the various toothed wheels 11 are aligned with respect to one another due to the interposition of the noses of arms 26 between two successive teeth of gears 11.

The upward movement of cage 2 is performed through any suitable mechanism, not shown in the drawing as it does not form part of the present invention. Such a device may comprise an arrangement for releasing the depressed keys or press-buttons 15 (Fig. 9), thereby permitting cam 16 to rotate in the reverse direction from that indicated by the arrow (thus resuming its position shown in Fig. 9) through the action of a recall spring having one end secured on cage 2 and acting upon the release of cam 16 by the unlocking of the aforesaid depressed keys 15 which may be obtained by acting with any suitable means upon the locking bar 17.

At this moment there is registered in the counters either a single item, if the numbered drums 1 have not already recorded prior amounts, or else a total sum, if the counter wheels have already recorded one or more prior items, the numbers appearing then through the window 75 provided in the guiding plate 64 (see Fig. 10) if this window is uncovered.

Further, if key 73 is thus actuated and sheet of paper 67 with its carbon paper is introduced into slot 68, the number registered in the counter may be printed on the sheet.

Figure 11:
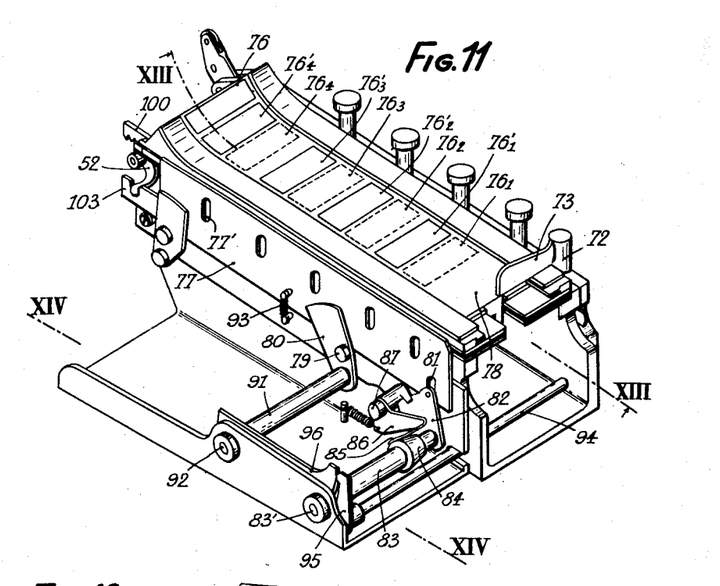
Fig. 11 is a perspective view showing a set of counters according to the invention, assembled in a row one behind the other.

Fig. 11 illustrates the case where several counters such as that shown in Fig. 1 are arranged one behind the other to form an assembly which may be incorporated for example, into a cash register mechanism. In this case it has been assumed that there are four counters corresponding to four different salesmen's operations (the counters corresponding to the four windows 76 1, 76 2, 76 3 and 76 4) and a fifth counter located behind the other counters for totalizing all the operations performed by the cash register and corresponding to window 76.

Each of said four counters 76 1 to 76 4 is provided with an operating key 15 similar to that already described and the assembly is also provided with a key 72—73 for performing the printing operation when the counters have resumed their inoperative position upon the sheet of paper inserted at 68 (Fig. 10).

The counters assembly shown in Fig. 11 comprises a number of safety devices which will now be described.

On the side of the macine, a protector plate 77 is provided for concealing normally the openings of the various sleeves 51 for resetting the counters and the slot 68 through which the sheet of paper is introduced. This plate has a number of openings 77' which may be brought to coincide, when the plate is moved, with the openings of said sleeves 51 (see Fig. 2) for re-setting the counters.

Furthermore, the windows 76 1 to 76 4 are normally closed, so that the numbers will not appear through these windows, by means of a sliding screen 78 provided with corresponding apertures 76'1 to 76'4 which may be moved to face said windows 76 1 to 76 4.

Figures 12, 14:
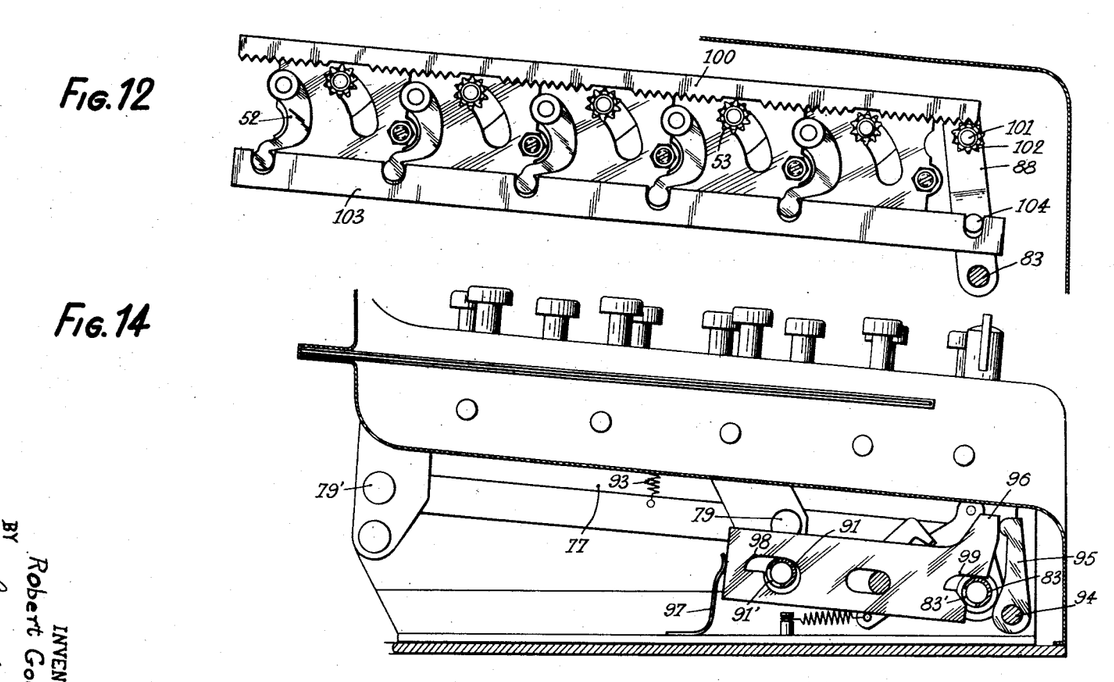
Fig. 12 is a lateral elevational view of the left hand portion of the counter asembly shown in Fig. 11 with the protector plate for the members used to reset the counters and everything to the left of this plate removed for the sake of illustrating clearly the resetting mechanism.
Fig. 14 is another section along XIV—XIV of Fig. 11.

The protector plate 77 (as shown in Figs. 11 and 14) is supported by guiding rollers 79 and 79' at least one of which, in this case, roller 79 is integral with the movable arm 80 whose function will be described later on.

Moreover, the front end of plate 77 has a groove 81 wherein engages a stud carried by a segment 82 keyed on a shaft or sleeve 83 the end of which is provided at 83' with a key-hole. This sleeve 83 also carries a conical member 84 adapted to co-operate with a blade spring 85 acting upon a locking member 86 pivoting at 87; this locking member has an extension or arm having a pawl-shaped end and is adapted to engage a notch corresponding thereto provided in the segment 82 for locking the latter.

When a key is introduced into the aperture 83' and pushed therein, the first result is the rocking of the locking member 86 due to the action of the conical member 84 and the consequent unlocking of segment 82. When the key is then turned, the connection between this segment and plate 77 causes the latter to move longitudinally, thereby uncovering the various apertured sleeves 51, thus permitting the individual re-setting of the four counters controlled by the four keys 15.

Figure 13:
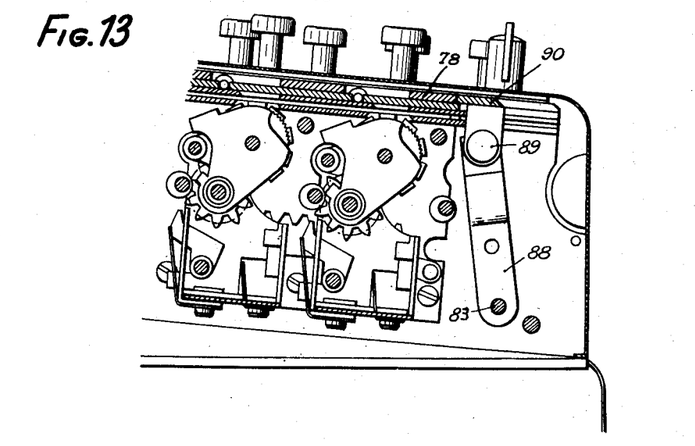
Fig. 13 is a longitudinal and vertical section along XIII—XIII of Fig. 11.

As further shown in Fig. 13, on shaft 83 is keyed an arm 88 whose other end is pivotally mounted at 89 on a member 90 integral with the screen 78 in such a manner that the windows 76 and 76 1 to 76 4 of the counters may be uncovered to show the numbered drums.

In other words, the individual re-setting of the various counters and the inspection of same can be performed only by the person possessing the key fitting the aforesaid key-hole of sleeve 83.

Besides, the lever 80 on which the bearing roller 79 of plate 77 is mounted is secured to a shaft 91 (Fig. 11) which may be operated by a key for which a suitable key-hole 92 is also provided. When this latter key is operated, roller 79 may be lowered, thus lowering plate 77 under the action of a return spring 93 connected thereto and permitting slot 68 to be uncovered. It is then possible to insert a sheet of paper with accompanying carbon paper into said slot and the results registered in the various counters may then be printed on the paper by operating key 73.

An additional safety feature is achieved by means of the following device, described with reference to Figs. 11 and 14. On the general locking shaft 94 of the apparatus an arm 95 is rigidly secured for co-operating with a plate 96. The latter, which is subject to the action of a return spring 97, has notches 98 and 99 contracted internally. This plate 96 may slide into two positions, the position of Fig. 14 in which sleeves 83 and 91 are released, or the position it assumes when the arm 95 has been turned slightly clockwise by means of the key controlling the general locking arrangement of the apparatus through shaft 94. In this latter position the contracted portions of notches 98 and 99 penetrate into apertures 91' and 83' provided in sleeves 91 and 83, respectively, so as to clamp and prevent any movement of said sleeves and their associated members (see Fig. 14).

The general re-setting of the different counters may be performed, as explained hereinabove, by means of a rack 100 (see Figs. 11 and 12). This rack 100 meshes with the toothed wheels 53 of the counters and comprises, as will be seen in Fig. 12, toothed and non-toothed portions. In the position shown in Fig. 12, which corresponds to the individual re-setting of the counters, rack 100 has not been operated and therefore the toothed portions thereof are not meshing with gears 53 of the counters which may therefore be re-set individually.

Contrarily, if it is desired to effect a general re-setting of the various counters, any suitable operating member such as a key is introduced into the sleeve 101 on which a gear wheel 102 is mounted for meshing with the aforesaid rack 100, thus moving the latter to the right and causing the toothed portions thereof to mesh with the various gear wheels 53 of the counters, thereby producing the general re-setting of the latter.

It should however be noted that beforehand, all the locking arms 26 provided for the different counters have been operated and lifted from wheels 11 for unlocking the latter and permitting the counters to be re-set. This has been made possible by the operation of various levers 52, which may be performed simultaneously by means of a bar 103 (Fig. 12) on which all the above-mentioned levers are attached. This bar in turn is driven by a stud or pin 104 integral with arm 88 keyed, as explained above, on shaft 83 by means of which the movement of plate 77 may be controlled for uncovering the apertures of the counters and, more particularly, aperture 101 which allows the general re-setting of the counters.

As will be readily apparent from the aforegoing description, by arranging several counters according to the invention, a unit or assembly may be constructed which is applicable to all kinds of adding machines and to cash registers in particular, with the addition of a complete safety device such as that described above. This assembly, described by way of example, constitutes a particular application of the invention and is to be considered only as an accessory feature thereof.

It is understood that the arrangements described hereinabove and illustrated in the accompanying drawings are given by way of example only and may be modified as to the details of their embodiment without thereby altering or departing from the general spirit and scope of the invention.

What I claim is:

1. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, means for selectively locking said carry-over gears, each said carry-over gear being effective when it is locked and the cage is moved from its active position to its indicating position to cause a rolling movement of the associated driving gear sufficient to advance the associated numeral wheel one step, and means operated by movement of each numeral wheel from "9" to "0" to operate the locking means for the carry-over gear of next higher order, so that upon the succeeding operation of the cage rotating means, the numeral wheel of next higher order will be advanced one step.

2. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking member for each of said carry-over gears, said locking members being movable between locking and unlocking positions, each said carry-over gear being effective when it is locked and the cage is moved from its active position to its indicating position to cause a rolling movement of the associated driving gear sufficient to advance the associated numeral wheel one step, means operated by movement of each numeral wheel from "9" to "0" to move the latch and locking member for the carry-over gear of next higher order in its locking position, and means associated with each numeral wheel and operated upon movement thereof from "8" to "9" while its associated locking member is in locking position to move and latch the locking member for the carry-over gear of next higher order in its locking position.

3. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking pawl for each of said carry-over gears, said locking pawls being independently movable between locked positions in engagement with their respective gears and released positions spaced from their respective gears, each said carry-over gear being effective when it is locked and the cage is moved from its active position to its indicating position to cause a rolling movement of the associated driving gear sufficient to advance the associated numeral wheel one step, cams fixed to the respective numeral wheels, followers for said cams, an operative connection between each follower and the locking pawl of the carry-over gear of next higher denominational order, each said follower being movable between a pawl-releasing position and a range of pawl-locking positions, means biasing each follower to its pawl-releasing position, a first nose on each said cam for engaging its associated follower and moving it from said pawl-releasing position to an extreme pawl-locking position as its associated numeral wheel moves from "9" to "0," a latch for each follower for holding it in extreme pawl-locking position whenever it is moved thereto, a second nose on each cam for engaging its associated follower and moving it from said pawl-releasing position to an intermediate pawl-locking position as its associated numeral wheel moves from "8" to "9," a latch carried by each follower for holding the follower of next higher denominational order in its intermediate pawl-locking position, said follower-carried latch having a normal ineffective position when its supporting follower is in its pawl-releasing position, and means for each follower effective upon movement thereof to a pawl-locking position to move the latch carried thereby to an effective latching position.

4. A counter for calculating machines as defined in claim 3, including means operated by movement of said cage to its indicating position to release said latches.

5. A counter for calculating machines or the like comprising a plurality of numeral wheel units, each unit including a numeral wheel, a driving gear fixed thereto and a carry-over cam fixed thereto, a first shaft, a plurality of sleeves keyed to said shaft, each sleeve rotatably supporting one of said units, said sleeves being flanged at one end and axially shorter than said units, spring means at one end of the shaft for holding said units and said flanges in frictional engagement, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, means for selectively locking said carry-over gears, each said carry-over gear being effective when it is locked and the cage is moved from its active position to its indicating position to cause a rolling movement of the associated driving gear sufficient to advance the associated numeral wheel one step, and follower means operated by each carry-over cam to operate the locking means for the carry-over gear of next higher order, so that upon the succeeding operation of the cage rotating means, the numeral wheel of next higher order will be advanced one step.

6. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carryover gears on said second shaft and engaging said wheel driving gears, a locking pawl for each of said carry-over gears, said locking pawls being independently movable between locked positions in engagement with their respective gears and released positions spaced from their respective gears, means biasing each said pawl toward its locked position, each said carry-over gear being effective when it is locked and the cage is moved from its active position to its indicating position to cause a rolling movement of the associated driving gear sufficient to advance the associated numeral wheel one step, cams fixed to the respective numeral wheels, followers for said cams, a projection on each follower for engaging the locking pawl of the carry-over gear of next higher denominational order, each said follower being movable between a pawl-releasing position and a range of pawl-locking positions, means biasing each follower to its pawl-releasing position, said follower biasing means being stronger than said pawl biasing means, a first nose on each said cam for engaging its associated follower and moving it from said pawl-releasing position to an extreme pawl-locking position as its associated numeral wheel moves from "9" to "0," a latch for each follower for holding it in extreme pawl-locking position whenever it is moved thereto, a second nose on each cam for engaging its associated follower and moving it from said pawl-releasing position to an intermediate pawl-locking position as its associated numeral wheel moves from "8" to "9," a latch carried by each follower for holding the follower of next higher denominational order in its intermediate pawl-locking position, said follower-carried latch having a normal ineffective position when its supporting follower is in its pawl-releasing position, and means for each follower effective upon movement thereof to a pawl-locking position to move the latch carried thereby to an effective latching position.

7. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking pawl for each of said carry-over gears, said locking pawls being independently movable between locked positions in engagement with their respective gears and released positions spaced from their respective gears, each said carry-over gear being effective when it is locked and the cage is moved from its active position to its indicating position to cause a rolling movement of the associated driving gear sufficient to advance the associated numeral wheel one step, cams fixed to the respective numeral wheels, followers for said cams, an operative connection between each follower and the locking pawl of the carry-over gear of next higher denominational order, each said follower being movable between a pawl-releasing position and a range of pawl-locking positions, means biasing each follower to its pawl-releasing position, a first nose on each said cam for engaging its associated follower and moving it from said pawl-releasing position to an extreme pawl-locking position as its associated numeral wheel moves from "9" to "0," a latch for each follower for holding it in extreme pawl-locking position whenever it is moved thereto and means operated by movement of said cage to its indicating position to release said latches.

8. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking pawl for each of said carry-over gears, said locking pawls being independently movable between locked positions in engagement with their respective gears and released positions spaced from their respective gears, each said carry-over gear being effective when it is locked and the cage is moved from its active position to its indicating position to cause a rolling movement of the associated driving gear sufficient to advance the associated numeral wheel one step, cams fixed to the respective numeral wheels, followers for said cams, an operative connection between each follower and the locking pawl of the carry-over gear of the next higher denominational order, each said follower being movable between a pawl-releasing position and a range of pawl-locking positions, means biasing each follower to its pawl-releasing position, a first nose on each said cam for engaging its associated follower and moving it from said pawl-releasing position to an extreme pawl-locking position as its associated numeral wheel moves from "9" to "0," a latch for each follower for holding it in extreme pawl-locking position whenever it is moved thereto, a second nose on each cam for engaging its associated follower and moving it from said pawl-releasing position to an intermediate pawl-locking position as its associated numeral wheel moves from "8" to "9," a spring latch carried by each follower for holding the follower of next higher denominational order in its intermediate pawl-locking position, each follower having a notch for receiving the spring latch on the follower of next lower denominational order, said follower-carried latches being self-biased toward a latching position and stationary stops for engaging said latches and holding them in ineffective positions when their supporting followers are in their pawl-releasing positions, said follower biasing means being stronger than said spring latches so that movement of the followers to their pawl-releasing positions moves the spring latches to their ineffective positions, said spring latches being effective upon movement of their associated followers to pawl-locking positions to move to effective latching positions.

9. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, means for selectively locking said carry-over gears, each said carry-over gear being effective when it is locked and the cage is moved from its active position to its indicating position to cause a rolling movement of the associated driving gear sufficient to advance the associated numeral wheel one step, means operated by movement of each numeral wheel from "9" to "0" to operate the locking means for the carry-over gear of next higher order, so that upon the succeeding operation of the cage rotating means, the numeral wheel of next higher order will be advanced one step, a locking pawl for each of said driving gears, and means for supporting said locking pawls in position to engage the driving gears when the cage is in said indicating position.

10. A counter for calculating machines or the like comprising numeral wheels, driving gears fixed to the respective numeral wheels, a first shaft supporting the wheels for independent rotation, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking pawl for each of said carry-over gears, said locking pawls being independently movable between locked positions in engagement with their respective gears and released positions spaced from their respective gears, means biasing each said pawl toward its locked position, each said carry-over gear being effective when it is locked and the cage is moved from its active position to its indicating position to cause a rolling movement of the associated driving gear sufficient to advance the associated numeral wheel one step, cams fixed to the respective numeral wheels, sliding plates extending generally parallel to said wheels and having extensions engaged by said cams when said cage is in its active position and acting as followers for said cams, a first projection on each plate for engaging the locking pawl of the carry-over gear of next higher denominational order, each said plate being movable between a pawl-releasing position and a range of pawl-locking positions, means biasing each plate to its pawl-releasing position, said plate biasing means being stronger than said pawl-biasing means, a first nose on each said cam for engaging its associated follower and moving its plate from said pawl-releasing position to an extreme pawl-locking position as its associated numeral wheel moves from "9" to "0," a latch for each plate for holding it in said extreme pawl-locking position, a second projection on each plate for engaging said latch, a second nose on each cam for engaging its associated follower and moving its plate from said pawl-releasing position to an intermediate pawl-locking position as its associated numeral wheel moves from "8" to "9," a spring latch carried by each plate and having a projection engageable with a notch in the plate of next higher denominational order to hold said last-mentioned plate in its intermediate pawl-locking position, said spring latch being self biased toward a latching position, and stationary stops for engaging said spring latches and holding them in normal ineffective positions when their supporting plates are in their pawl-releasing positions, said plate biasing means being stronger than said spring latches so that movement of the plates to their pawl-releasing positions moves the spring latches to their ineffective positions, said spring latches being effective upon movement of their associated followers to pawl-locking positions to move to effective latching positions.

11. A counter for calculating machines or the like comprising numeral wheels, driving gears fixed to the respective numeral wheels, means including a first shaft supporting the wheels for independent frictional rotation on said shaft, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, a locking pawl for each of said carry-over gears, said locking pawls being independently movable between locked positions in engagement with their respective gears and released positions spaced from their respective gears, each said carry-over gear being effective when it is locked and the cage is moved from its active position to its indicating position to cause a rolling movement of the associated driving gear sufficient to advance the associated numeral wheel one step, cams fixed to the respective numeral wheels, followers for said cams, an operative connection between each follower and the locking pawl of the carry-over gear of next higher denominational order, each said follower being movable between a pawl-releasing position and a range of pawl-locking positions, means biasing each follower to its pawl-releasing position, a first nose on each said cam for engaging its associated follower and moving it from said pawl-releasing position to an extreme pawl-locking position as its associated numeral wheel moves from "9" to "0," a first latch for each follower for holding it in extreme pawl-locking position whenever it is moved thereto, a second nose on each cam for engaging its associated follower and moving it from said pawl-releasing position to an intermediate pawl-locking position as its associated numeral wheel moves from "8" to "9," a second latch carried by each follower for holding the follower of next higher denominational order in its intermediate pawl-locking position, said follower-carried latch having a normal ineffective position when its supporting follower is in its pawl-releasing position, and means for each follower effective upon movement thereof to a pawl-locking position to move the latch carried thereby to an effective latching position, a third nose on said cam facing in the direction opposite to that of said first and second noses, a projection on each said first latch, means effective upon movement of said cage to its indicating position to move said first latch to a releasing position in which said projection is positioned to engage said third nose when said numeral wheel is in its zero indicating position, and reset means operable when said cage is in said indicating position to rotate said first shaft backward and thereby drive all the numeral wheels backward until their third cam noses engage said first latch projections and said numeral wheels are in their zero indicating positions.

12. A counter for calculating machines or the like comprising a plurality of numeral wheel units, each unit including a numeral wheel, a driving gear fixed thereto and a carry-over cam fixed thereto, a first shaft, a plurality of sleeves keyed to said shaft, each sleeve rotatably supporting one of said units, said sleeves being flanged at one end and axially shorter than said units, spring means at one end of the shaft for holding said units and said flanges in frictional engagement, means for independently driving said gears to vary the angular positions of said numeral wheels, a cage carrying said shaft and wheels, a second shaft parallel to and spaced from said first shaft and pivotally supporting said cage, means for rotating said cage on said second shaft between an active position wherein said gears engage said driving means and an indicating position wherein said numeral wheels may be observed, carry-over gears on said second shaft and engaging said wheel driving gears, means for selectively locking said carry-over gears, each said carry-over gear being effective when it is locked and the cage is moved from its active position to its indicating position to cause a rolling movement of the associated driving gear sufficient to advance the associated numeral wheel one step, means operated by each carry-over cam to lock the locking means for the carry-over gear of next higher order, so that upon the succeeding operation of the cage rotating means, the numeral wheel of next higher order will be advanced one step, means for rotating said first shaft to drive the numeral wheel units backward while said cage is in its indicating position, and means including a backwardly facing step on each said carry-over cam and a cooperating stop member for limiting the backward rotation of each numeral wheel to its zero indicating position while said cage is in its indicating position, so that one revolution of said first shaft while the cage is in its indicating position will reset all said wheels to their zero indicating positions.

13. A counter for calculating machines or the like as defined in claim 12, including locking pawls normally engaging said driving gears when said cage is in its indicating position, so as to hold said numeral wheels in alignment, and means for releasing said locking pawls so as to permit resetting of the numeral wheels by operation of said shaft rotating means.

14. A calculating machine or the like including a plurality of counters as defined in claim 12, and means for simultaneously rotating the shafts of all said counters to reset them all to zero.

ROBERT GOURDON.

References Cited in the file of this patent

UNITED STATES PATENTS

| Number | Name | Date |
|---|---|---|
| 771,505 | Stahlberg | Oct. 4, 1904 |
| 1,167,332 | Brown | Jan. 4, 1916 |
| 1,212,320 | Brown | Jan. 16, 1917 |
| 1,214,886 | Brown | Feb. 6, 1917 |
| 1,386,021 | Peters | Aug. 2, 1921 |
| 1,569,188 | Johantgen | Jan. 12, 1926 |
| 1,865,883 | Bornkessel et al. | July 5, 1932 |
| 1,878,125 | Fuller | Sept. 20, 1932 |
| 1,950,480 | Carroll | Mar. 13, 1934 |
| 1,951,682 | Varren | Mar. 20, 1934 |
| 2,251,249 | Cleven | July 29, 1941 |
| 2,285,427 | Friden | June 9, 1942 |
| 2,360,704 | Moody | Oct. 17, 1944 |
| 2,428,084 | Lambert | Sept. 30, 1947 |
| 2,469,655 | Leathers | May 10, 1949 |